US007467163B1

(12) United States Patent
Dodds et al.

(10) Patent No.: US 7,467,163 B1
(45) Date of Patent: Dec. 16, 2008

(54) SYSTEM AND METHOD TO MANIPULATE LARGE OBJECTS ON ENTERPRISE SERVER DATA MANAGEMENT SYSTEM

(75) Inventors: James Allen Dodds, San Juan Capistrano, CA (US); Kung Yi Lin, Irvine, CA (US); Johnny Hu, Irvine, CA (US); Alma Navarro de Jesus, Monrovia, CA (US); Vikki Mei-Whey Lai, Orange, CA (US); Courtney Chi Hoang, Fountain Valley, CA (US); Minh-Nguyet Tran, Cypress, CA (US); Subramaniam Ramamurthi, Rancho Santa Margarita, CA (US); Valerie Renee Schmidt, Huntington Beach, CA (US)

(73) Assignee: Unisys Corporation, Blue Bell, PA (US)

( * ) Notice: Subject to any disclaimer, the term of this patent is extended or adjusted under 35 U.S.C. 154(b) by 286 days.

(21) Appl. No.: 11/352,091

(22) Filed: Feb. 10, 2006

(51) Int. Cl.
*G06F 17/30* (2006.01)
(52) U.S. Cl. ..................... 707/104.1; 707/1; 707/10; 707/100; 707/103 R; 707/205
(58) Field of Classification Search ............. 707/1, 707/10, 100–104.1
See application file for complete search history.

(56) References Cited

U.S. PATENT DOCUMENTS

| | | | |
|---|---|---|---|
| 5,561,793 A | 10/1996 | Bennett et al. | |
| 5,794,250 A | 8/1998 | Carino, Jr. et al. | |
| 5,819,301 A | 10/1998 | Rowe et al. | |
| 5,864,843 A | 1/1999 | Carino, Jr. et al. | |
| 5,873,083 A | 2/1999 | Jones et al. | |
| 5,924,100 A | 7/1999 | Chang et al. | |
| 5,999,943 A * | 12/1999 | Nori et al. ............... | 707/104.1 |
| 6,032,160 A * | 2/2000 | Lehman .................... | 707/205 |
| 6,144,970 A | 11/2000 | Bonner et al. | |
| 6,256,626 B1 | 7/2001 | Dong et al. | |
| 6,343,293 B1 | 1/2002 | Lyle et al. | |
| 6,370,541 B1 | 4/2002 | Chou et al. | |
| 6,389,414 B1 | 5/2002 | Delo et al. | |
| 6,487,551 B2 | 11/2002 | Dong et al. | |
| 6,535,895 B2 | 3/2003 | Bonner et al. | |
| 6,560,598 B2 | 5/2003 | Delo et al. | |
| 6,567,928 B1 | 5/2003 | Lyle et al. | |
| 6,578,046 B2 | 6/2003 | Chang et al. | |
| 6,606,617 B1 | 8/2003 | Bonner et al. | |
| 6,615,219 B1 | 9/2003 | Bruso et al. | |
| 6,658,437 B1 * | 12/2003 | Lehman .................... | 707/205 |
| 6,738,790 B1 | 5/2004 | Klein et al. | |

* cited by examiner

*Primary Examiner*—Cam-Linh Nguyen
(74) *Attorney, Agent, or Firm*—James E. Goepel; Alfred W. Kozak; Robert P. Marley (57) ABSTRACT

An Enterprise Server Data Management System provides for the handling of large data objects (LOB) according to the data size required for the large object. Methods are provided to find a particular object that is stored or to delete such an object. But particularly the method arranges for data storage of Large Objects in a structured database, depending on the number of kilobytes forming the Large Object (LOB).

12 Claims, 9 Drawing Sheets

FIG. 1

INTERNAL TANKS

6K <= SIZE BYTES

6K < SIZE <= 60K BYTES

60K < SIZE BYTES

TANK LAYOUT

| | |
|---|---|
| LOB-KEY | Record number or file relative record address of tank that starts from the number 1 |
| LOB-STR | Structure number of the structure that owns the LOB item |
| LOB-WHEN-CREATED | Update level of the owner structure (LOB-STR) when the LOB item is created |
| LOB-RSN | RSN of the record which owns this LOB item |
| LOB-ID-NUM | A unique number assigned by DMSII for every LOB item in the database |
| LOB-OCCUR-NUM | Occurrence number of the LOB item if the LOB item is declared as an occurring item |
| LOB-BASE-KEY | Record number of the first record for the LOB item |
| LOB-DELETED | Deleted LOB flag to indicate that this LOB item is deleted |
| LOB-SIZE | Size of the LOB item in number of records |
| LOB-SIZE-BYTES | Size of the LOB item in bytes |
| LOB-LAST-STORED | Location of the last byte written for the LOB item |
| LOB-GROUP-DATA | LOB data container which contains the actual data |

SYSTEM AND METHOD TO MANIPULATE LARGE OBJECTS ON ENTERPRISE SERVER DATA MANAGEMENT SYSTEM

CROSS-REFERENCES TO RELATED APPLICATIONS

This application is related to a co-pending application, U.S. Ser. No. 11/103,904, filed Apr. 12, 2005, entitled "Method For Storing And Managing Large Data Objects External To The Database For OLE DB Applications", which is incorporated herein by reference.

U.S. Pat. No. 6,366,900, issued Apr. 2, 2002, entitled "Method For Analyzing The Conditional Status Of Specialized Files", which is incorporated herein by reference.

U.S. Pat. No. 6,411,969, issued Jun. 25, 2005, entitled "Enhanced System And Method For Management Of System Database Utilities", which is incorporated herein by reference.

U.S. Pat. No. 6,351,744 B1, issued Feb. 26, 2002, entitled "Multi-Processor System For Database Management" which is incorporated herein by reference.

FIELD OF THE INVENTION

The present system and method provides features which will allow users to manipulate large objects which have been stored in a database. A new Host Language Interface has been created for ALGOL and COBOL compilers to insert, to delete, and also to find large objects stored in the database.

BACKGROUND OF THE INVENTION

A Database Management System consists of a set of tools used to develop and manage a database. The present system utilizes a DMSII, which is a Database Management System available on a Unisys Corporation's ClearPath HMP NX, and the Unisys A-Series systems. A background for the Unisys DMSII systems is available in a publication of the Unisys Corporation, Document 8807 6625 000, entitled "*Getting Started With DMSII*" and published in September 1997 by the Unisys Corporation. The DMSII Utilities provide database backup and recovery capability for the entire database or for partial databases. The background operations of the DMSII utility enhancements are published in a Unisys Corporation publication Document 98037/4 and entitled "DMSII Utility Enhancements" published on Mar. 31, 1999.

Database Management Systems are used by many large and small businesses such as airline reservation systems, financial institutions, retail chains, insurance companies, utility companies and government agencies. The present Database Management System (DMS) in its form as DMSII is used to build database structures for items of data according to some appropriate logical model, such as relational, hierarchical, or network. Further, the Database Management System is used to manage the database structures and keep the structures in some other stable order while various application programs may be retrieving or changing the data. The present embodiment of DMSII has a data definition language designated as Data And Structure Definition Language (DASDL).

There are various tasks that are performed in database management and these involve (i) monitoring and optimizing database performance; (ii) the use of database control for monitoring multi-program database access; (iii) the function of the data integrity and safety done by integrity checking and preventing access to the same data by multiple applications occurring at the same time; (iv) the function of defining data structures and the data fields within them, including the function of modifying data structures; (v) data access operations and developing an application program to retrieve data or to change data; (vi) the function of data shareability to provide multi-program access without conflicts and provide database definitions to the application program; (vii) in database and data security, to prevent unauthorized database access; (viii) ensuring independence of application programs from certain data changes and preventing the revision of application programs every time a structure changes; (ix) in database and data recovery, performing the resumption of database operations after an interruption; (x) tracking data changes by keeping a record of every change made to the data; (xi) for data change integrity, ensuring that update changes are applied to, or removed from, the database in their entirety; (xii) providing a recent copy of the database as a reserve by backing-up the database and storing copies of audit files and all other database files; (xiii) providing for database scalability by growing or shrinking the database according to the ongoing needs at the time.

The DMSII provides standard software files that perform services and operations for all the databases connected to the systems Enterprise Server. This enables a viewing of a list of all these files on the user terminal.

In the ordinary course of operations, the application program user will submit changes to data or retrieve data while running a particular application program. Then, changes can be made which add, modify and delete data. A Database Administrator (DBA) keeps the database running smoothly and enforces the rules for data integrity and security. Users access the database through a given application program which itself does not access the data directly. Instead, the program interacts with the DMSII software and the database tailored software, which is directed by the access routines of the Data Management System to provide accesses, retrievals and the storage of data in the physical database file.

In regard to access, an application user will access the data in order to (i) make an inquiry to get a Read of data in the database, or (ii) to provide an update by doing a Write to the database thus, adding, deleting or changing data. The access for either purpose contributes to an operation on the database, which is called a "transaction".

A transaction is a sequence of operations grouped by a user program because the operations constitute a single logical change to the database, At the end and finality of the transaction point, the transaction is complete and without error, and it is considered as being committed to the database.

Actual real world data goes into special logical structures that are used by the Data Management System to store data. The database is designed to map categories of data into suitable structures. For example, the real world data would have a character with a structure called a "data set". An example of this would be a particular person's name. Then, real world data that can serve as an index of a whole data set has a structured name called a "set". This, for example, might be the social security number of any employee. Then there is data that can serve as an index of a data set under a certain condition, and this is called a "subset". This might be an employee's work number, for example. Then, there is data about each instance of a particular category and the structure name for this is "data item". An example of this might be the name and address of the category (person). Then, there is data related to the database as a whole, and this involves a structure called "global data item". An example of this might be the total number of employees in a company. Once there has been identification of the real-world data which is to be stored in the database, it is then necessary to define that data in relationship to the data structures of the data management system that holds data. When this data is defined within "structures", then the data management system and the system software programs an application program that can then understand how to make this data accessible for various inquiries and/or changes. This is done with the Data and Structure Definition Language (DASDL).

The Data Management System structures are the building blocks of the Data Management System database. Here, the "data set" has the purpose of storing data pertaining to a data category in a collection of records. A "set" has the purpose of indexing all records in a data set. A "subset" serves the purpose to index some records in a data set according to some given criteria. The "data item" is a structured name, which defines a unit of information about a category in a given field (column) of a data set record. A "global data item" serves the purpose of storing a unit of information about the entire database or any of its involved structures.

In general discussion about the types of data and the names of data structures, it is often seen that in a relational database, a "data set" is called a "table". A "set" or "subset" is frequently called an "index". A "data item" is often called a "field" or a "column", or is often called by its data name, for example, a project number. "Structures" are made of common file components designated as records and fields.

A record is a group of logically related data items in a file. Often, a record is called a row. Data items reside in different fields in the records. For example, a record might involve a series of data such as an employee's name, the employee's I.D., the employee's social security number and years of employment. A group of such records would constitute a file.

The operating system, which is used by the data management system, will treat the record as a unit. The system makes data available to users in records and not in individual single items of data. In programming languages, the record is the unit of data that the system reads from or writes to a file in one execution cycle of a Read or Write statement in a program.

If the application program wants to change a data item in a given record, the Data Management System brings a copy of the record from the physical storage over to memory, then enables that data item to be changed, and then writes the changed record back to the file.

A "field" is a consecutive group of bits or bytes within a particular component of a record, which will represent a logical piece of data. A field or column is defined by the description of the data item it is to hold. For example, if one field carries the name of an employee, this field in the record could be called the name field.

The "data set" is a physical file, that is to say, a collection of related data records stored on a random-access storage device, such as a disk in which the data resides.

A data set is kept up-to-date in several ways: (i) here, application programs add, change, or delete individual pieces of data or records stored in the data set; (ii) the Database Administrator (DBA) maintains the structure of the data set by keeping the data set within certain maximized limits, by adding, deleting or changing the definition of a data item, creating new sets or subsets, monitoring automatic processes that guard data integrity and creating guard files to enhance the security of the data.

A "set" is a separate stored file that indexes all the records of a single data set. The Data Management System uses sets in order to locate records in a data set. A set has no meaning apart from its related data set. The set structure enables an application program to access all records of a data set in some logical sequence.

A "subset" can be considered identical to a set, except that the subset need not contain a record for every record of the data set. A subset is a file that indexes none, one, several, or all of the records in a data set. The subset structure enables an application program to access only records of a data set that meet a particularly required condition.

For example, an application program may compile a list of people who are "managers". Thus, it is seen that the database designer created the "manager" subset. Thus, in order to retrieve a record of managers, the data management system can use the smaller file, that is, the subset, to quickly point to the corresponding records in the larger file, which is the data set. As with the set, the subset must also be kept up-to-date.

A "data item" is an element of data. In the Data Management System, a data item can also be the field (column) in the database record. For example, the social security number could be considered as a data item in the sample data set designated "person". The purpose of the data item is to describe the data to be stored. The data item provides the identity—type, size, location, and attributes—of one element of data for a database entity. When an application submits an update to a data item, the Data Management System will accept the update if it corresponds to the definition of a data item. Otherwise, the change is rejected and reported as an exception. The Database Administrator will add, delete or change the data item definitions.

There are a number of data items that are used by the Data Management System. These include the type called "alphanumeric" which includes words and characters, names, addresses, dates and titles. Then, there are data items designated as "numeric" which involve integers and decimals with or without signs. Then, there are data items designated as "real" which involve single precision floating point numbers that occupy one word. An example of this would be, for example, an employee's salary. Then, there are data items, which are called "Boolean" which involve TRUE and FALSE values.

The "global data item" is a data item, a group item, or a population item that is not part of any data set but still pertains to the database as a whole. Such global data items are stored in one special record called the "global record" in the DASDL declaration, which is outside the structured definitions. Sometimes the global record is placed just before the structured definitions in the DASDL file. The global data item has the purpose of holding permanent information about the database as a whole or about a particular data set. It also acts as a placeholder for information that can be derived from the database.

One of the most significant options in DASDL (Data And Structure Definition Language) is that it is possible to define the database as to whether the database is to be audited. The data management system supports both logging changes to a database (auditing the database) or not logging changes (maintaining an unaudited database). There are advantages in auditing a database since this assures the user that if a database failure occurs, there will be a record of database changes with which one can restore the database to a completely integral state and thus avoid loss of information and corruption of information.

DESCRIPTION OF RELATED ART

The Unisys Enterprise Database Server for ClearPath MCP (a.k.a. DMSII) consists of Tables and Indexes. MCP refers to Unisys Master Control Program, which is the Operating System for Unisys ClearPath mainframes. Tables generally are used to store facts. For example, a table called "Customers"

may store data pertaining to the customers of an enterprise such as Customer-Name and Customer-Address. Another table called "Employees" would store the employees of the organization. This table would store information such as Employee-Name, Employee-Salary, Employee-Address and Employee-Department. Columns such as Employee-Name and Employee-Salary have distinct data types (character and numeric respectively), are small in size and are stored in the database record itself. However, new applications require that other objects besides plain text and numbers be stored in the database.

In a lot of applications there is a need to store large text or binary data in the database. The definition of large usually means that the data size is beyond the maximum length of a single database field. In DMSII, this means the character or binary data up to 4095 bytes can be stored in a single field. Depending on the application, such large data may either be in the range of some Kilobytes (for example when storing text only E-Mails or regular XML documents), but it may also extend to several Megabytes (binary data such as large graphics, PDF files, videos, etc.).

Artifacts such as pictures, videos, large graphics images from geo-spatial applications or large volumes of text, collectively known as "large objects" are often required to be stored in databases. The prior art software did not enable the storage of such large objects in DMSII. It was left up to individual applications to manage large data objects. Mostly all applications had to store and manage files containing the large object data themselves in operating system managed file space, i.e. outside the database. This requires applications to invent schemes to manage the storage of these data files. Since these objects are not stored in the database there is a need to create a relationship between the database record and the related unstructured large object data by saving the filename containing the large object data in the database. Responsibility for managing these relationships rests entirely with all individual applications.

The upshot is that the application infrastructure for the database is very fragile. In order to make sure the applications are robust, the database system must be responsible for managing such external large objects. However, DMSII does not provide any mechanism for managing external files for storing large object data. It is therefore important to provide a uniform, reliable and robust way for managing and accessing large object data that is stored external to the database.

SUMMARY OF THE INVENTION

The present system uses a specialized Enterprise Database Server, using a Master Control Program (MCP) which constitutes a Data Management System (DMSII). However, under the prior developments of the Data Management System, the system did not allow users to store extra large objects in the database of the system. The present system and method allows users to store extra large objects in the database, and also allows users to manipulate these large objects. The newly-developed Host Language Interface is created for ALGOL and COBOL compilers in order that the user may find large objects, or insert large objects, or delete large objects.

An internal tank has been created for large object storage. Each tank contains a direct data set, an access enablement, and also two automatic subsets.

In this system, there are three types of tanks which are created. One is for objects less than or equal to 6K bytes, the second tank is for objects greater than 6K bytes and less than or equal to 60K bytes, and the final or last tank is for objects that are larger than 60K bytes.

A command designated "ASSIGN_LOB" is used to allocate space only, to allocate and store the data and also to append data to an existing object.

Another command designated "FIND_LOB" is used to locate an existing object in the database.

Another command "DELETE_LOB" is used in order to delete an existing object in the database.

GLOSSARY ITEMS

1. ACCESSROUTINES: The software component of the Enterprise Data Server product that is primarily responsible for the accessing (creating, modifying and deleting) of data in an Enterprise Data Server database. ACCESSROUTINES is also responsible for auditing all changes to the database.

2. ACR: See ACCESSROUTINES.

3. ADDR: The address of a record in the CAUDIT file: composed of Block Address; word address; and Structure number.

4. AUDIT FILE: Logically considered to be the sequential storage of Audit Records, it is actually the sequential storage of Audit Blocks that contain the Audit Records. Traditionally, an Enterprise Data Server Audit File has been implemented with a single MCP disk file.

5. AUDIT SECTION: With DMSII XE, multiple MCP disk files can be used to physically implement a single Audit File. Each of these disk files is referred to as a Section of the Audit File. The sequence of Audit Blocks is spread, round robin fashion, among the multiple Audit Sections.

6. AUDIT TRAIL: The sequence of Audit Files that are created that span the life of the database. Each Audit File is assigned an Audit File Number (AFN) starting at 1 when the database is created and incremented by one when each new Audit File is created. An Audit File may be Sectioned or not. The individual Sections of an Audit File all share the same AFN value, although they each have a unique section number within their Audit File.

7. BDMS (Burroughs Data Management System): We normally use this with compilers such as BDMS COBOL85 or BDMS ALGOL.

8. BLOB—BINARY LARGE OBJECT: Initial portion is stored locally in the owning record; remainder is stored in an overflow area. Stored in "chunks"; chunk size and total length are returned as parameters to readers. Fully recoverable by the DBMS. BLOB type is both stored and returned to the applications (e.g., AVI, TXT, JPG, MP3, etc.) Individual components (chunks) are not accessible. Has a maximum length; typically 4 GB.

9. CLEARPATH INTRACONNECT ARCHITECTURE (CIA): A high-performance, low-latency HMP interconnect technology for ClearPath NX5620, NX5820, NX6820 systems. It provides an efficient means for system software in the MCP and Windows environments to communicate with each other.

10. CLEARPATH MCP RELEASE: A regularly scheduled release of the system and networking software used in the Master Control Program (MCP) environment.

11. CLEARPATH SERVER: A family of enterprise-class servers available from Unisys. This family includes the ClearPath servers, ClearPath A Series servers, and ClearPath 2200 Series servers.

12. CLOB—CHARACTER LARGE OBJECT: Stores character data. Initial portion is stored locally in the owning record; remainder is stored in an overflow area. Stored in "chunks", chunk size and total length are returned as parameters to readers. Fully recoverable by the DBMS. Local portion (or at least some part of it) may be used an as index key (values stored in the index set are of fixed length and may be padded). Restrictions on reorganization. Has a maximum length; typically 4 GB.

13. COMPACT DATA SET: In the Enterprise Database Server, a collection of related data records stored in a file. These records are not maintained in logical order. The length of each record can vary because the data set items can vary in size or in number of occurrences, or because the data set items are stored conditionally.

14. CONTROL FILE: The Control File is unique to each database and is used to maintain state information between each activation of a database, as well as across Halt/Loads. This file contains essential control information for the KEYEDIOII system. For example, this would indicate the maximum number of buffers that can be used or the maximum elements of memory which can be allocated, and so on.

15. CONTROL POINT: A logical construct within Enterprise Database Server used to limit the number of audit records that must be reprocessed in the event of a system failure. Data buffers which have been modified are guaranteed to be written to disk at least once every two control points, thus halt/load recovery need only process changes since the second to last control point in an audit trail. Control Points occur on a user-specified frequency defined in SYNC points.

16. CSC (CUSTOMER SUPPORT CENTER): The Unisys organization tasked with answering customer questions and problem resolution. CSC is the first line of support for customers after consultation with any on-site representatives.

17. DASDL (DATA AND STRUCTURE DEFINITION LANGUAGE): The language used to specify the structure and specific software configuration for a database. This is also the abbreviated name for SYSTEM/DASDL, the generator used to create ("compile") Enterprise Database Server Description Files from the DASDL source.

18. DATA MANAGEMENT SYSTEM II (DMSII): A specialized system software package used to describe a database and maintain the relationships among the data elements in the database. This system is described in a September 1977 Publication of Unisys Corporation, entitled "Getting Started With DMSII," Unisys Publication No. 8807 6625-000.

19. DATA SET: (1) A disk file, potentially a group of disk files, containing data records all in a similar format. (2) An Enterprise Database Server structure type declared in DASDL. (3) In the Enterprise Database Server, a collection of related data records stored in a file on a random-access storage device. A data set is similar to a conventional file. It contains data items and has logical and physical properties similar to files. However, unlike conventional files, data sets contain other data sets, sets and subsets.

20. DATABASE OPERATIONS CENTER (aka DATABASE OPERATIONS CENTER or just DOC): A graphical interface for performing database administration functions.

21. DBA: Database Administrator.

22. DBASSIGNLOB: Unisys DBMS Cobol85 compiler syntax to perform Assign LOB function.

23. DBCENTER: (See DATABASE OPERATIONS CENTER).

24. DESCRIPTION FILE: This file contains the "machine readable" layout of every aspect of a database. A new copy is generated by DASDL for each format level and is used by SYSTEM/DMCONTROL, as well as DMINTERFACE in support of the language compilers.

25. DIRECT DATA SET: In the Enterprise Database Server, a collection of related data records stored in a file. These records are maintained in key value order. One unsigned numeric data item in the record is designated as the key item.

26. DMCONTROL: SYSTEM/DMCONTROL is a database utility program that is capable of understanding the database Description File and is used to maintain and recover the Control File.

27. DMZNQ: An interface that allows programs written in DMALGOL to communicate directly with ACCESSROUTINES.

28. DMINTERFACE: An interface used by the language compilers to translate the properties of a database into the record area offsets used by the compiled application program.

29. DMSII (Unisys DATA MANAGEMENT SYSTEM II): (See ENTERPRISE DATA SERVER).

30. DMSUPPORT: The DMSupport Library is unique to each format level of a database. It contains the mappings between the storage layouts used by the database and those used within the application program record areas.

31. DOC: (See DATABASE OPERATIONS CENTER).

32. ENTERPRISE DATABASE SERVER: (See UNISYS e-@ction ENTERPRISE DATABASE SERVER FOR CLEARPATH MCP).

33. ENTERPRISE DATABASE SERVER: The comprehensive, primary database management software package developed by Unisys that is in use on Unisys A Series and ClearPath families of mainframe computers.

34. FILE NAME: (1) A unique identifier for a file, consisting of 1 to 14 name constants separated by slashes. Each name constant consists of 1 to 17 letters, digits, hyphens, and/or underscores. A file name can be optionally preceded by an asterisk (*) or usercode, and optionally followed by "ON" and a family name. (2) in RPG, a name that designates a set of data items. (3) In COBOL, a user-defined word that names a file described in a file description entry or a sort-merge file description entry within the FILE SECTION of the DATA DIVISION.

35. HOST LANGUAGE INTERFACE (HLI): An interface to the Data Management System II (DMSII) is provided in the BDMSALGOL, BDMSCOBOL74 and BDMSCOBOL85. BDMSALGOL is based on Unisys Extended ALGOL which contain extensions that enable a programmer to declare and use databases. BDMSCOBOL85 is based on Unisys Extended COBOL85 which contain extensions that enable a programmer to declare and use databases.

36. INDEX: This is a term which also indicates the key.

37. INDEX FILE: A file which contains the key and a pointer which points to a record of the data file. The index file is used to search for the data record based on a key value for efficient rapid access.

38. INDEXED ORGANIZATION: The permanent, logical file structure in which each record is identified by the value of one or more keys within that record.

39. INDEXED SEQUENTIAL ACCESS METHOD (ISAM): A method that provides efficient, flexible random access to records identified by keys stored in an index.

40. KEY: (1) A field used to locate or identify a record in an indexed file; (2) In COBOL, a data item that identifies the location of a record, or a group of data items that identifies the ordering of data; (3) In Data Management System II (DMSII), a field that serves as a retrieval key for a set or subset.

41. KEY FIELD: This is a portion of a data record which contains the key data.

42. KEYEDIOII: This is a software methodology designated as Unisys Indexed Sequential Access Method (ISAM) software for COBOL 74 and Report Program Generator (RPG) programming languages. It is based on DMSII (Data Management System II) so as to take advantage of the features of DMSII. KEYEDIOII is basically described in Unisys Corporation Publication 5044043.372 (1988).

43. LINC (LOGIC AND INFORMATION COMPILER): A Unisys marketed product for application program development.

44. LOBUTILITY PROGRAM: A new DMSII component which manages Large Objects. If a database has internal Large Objects defined in DASDL, several tank data sets are established by the software. Those tanks need to be maintained to ensure that: (1) Large Objects are deleted if DASDL changes are made that are associated with the Large Objects; and (2) Disk space of deleted Large Objects is consolidated.

45. LOCATOR SUBSET: A subset that is used to locate the large object in the large object container.

46. MASTER CONTROL PROGRAM: The Operating System developed by Unisys that is in use on Unisys A Series and ClearPath families of mainframe computers.

47. MCP: (See MASTER CONTROL PROGRAM).

48. MODEL DB: A process that allows two or more structurally identical databases to share the same DMSupport Library. When Modeling is used, applications can be run interchangeably against any of the models by using Database Equation. Each Modeled database has its own Control and data files. A database equation causes a program to use another database other than the normal database.

49. NX/DB CENTER: (See DATABASE OPERATIONS CENTER).

50. OLE DB: A Unisys product that is compatible with the Microsoft™ OLE DB standards. It is used to access databases of all types across multiple platform and Operating System types.

51. OLE DB WORKER: An OLE DB Provider component provides services between an OLEDB client and a DMSII database.

52. RDB: (See REMOTE DATABASE BACKUP).

53. RECORD KEY: A key, either the prime record key or an alternate record key, with contents that identify a record within an indexed file.

54. RECORD SERIAL NUMBER (RSN): A read-only value assigned by Enterprise Database Server and guaranteed to be unique within a dataset (but not within a database). Once a record is created, its RSN value will not change, nor is the RSN value re-used after the record is deleted. The primary use of Record Serial Number (RSNs) is to reduce the overhead associated with reorganizing sets that allow duplicates but do not have DUPLICATES FIRST/LAST specified. RSN items may be used as a key for a set and can be interrogated by application programs to identify specific records.

55. REMOTE DATABASE BACKUP (RDB): A disaster recovery capability for DMSII databases that enables the replication of an audited (primary) database on a second host. The replicated (secondary) database is kept up-to-date with the primary database through the application of audits from the primary database. The secondary database can take over the role of the primary database.

56. REORGANIZATION: The process used to change the physical layout of a data structure, as well as to add or delete structures.

57. REORGDB: (1) A new mode of reorganization that provides uninterrupted access to a Live database while the reorganization is in progress. The reorganization runs in the background using a Model database while updates to, and inquiries of, the Live database continue. After a successful reorganization to the new DASDL specification, the captured updates are applied to the reorganized Model database and the updated data structures are migrated to the Live database; (2) An optional specification that can be used within SYSTEM/BUILDREORG.

58. RSN: (See RECORD SERIAL NUMBER). Glossary Item #54.

59. SCHEMA: The description of a database, its data components, and their interrelationships. In Enterprise Database Server terms, it is typically referred to as the "DASDL".

60. SECTION: In Enterprise Database Server New Plateau, a section is a portion of a data structure that can be physically accessed independently of other portions of the structure. For data sets and audit files in New Plateau, each section is implemented as a separate physical file. For sets, sections exist within a single physical file but can be accessed without impact on or from other sections within the same file.

61. SET: (1) In the Enterprise Database Server, a file of indexes that refers to all the records of a single data set. Sets are automatically maintained by the system. Sets permit access to the records of a data set in some logical sequence and are normally used to optimize certain types of retrievals of the data set records; (2) A collection of information that the Enterprise Database Server uses to locate records in a data set. In Inquiry, sets can be used in SELECT or DISPLAY commands to designate how a data set should be accessed.

62. SIB2: A two-dimensional array of Structure Information Blocks that is unique to each database opener. Each row of the array corresponds to a structure that has been either explicitly or implicitly opened by the application and is the application's state information as it pertains to that structure.

63. SIBDESC (SIB Description Array): This contains basic information such as structure number and update levels for each structure opened by a database user. This information is built by the language compiler and used by the ACR (Access-Routines) during the application's open process which also constructs the SIB2 array.

64. SIM (SEMANTIC INFORMATION MODEL): This is an optional component of Enterprise Database Server that allows the database description to contain an organization's business case rules. These rules are then enforced by the ACCESSROUTINES, rather than having to be coded into the application programs.

65. SPACE SUBSET: A subset that is used to locate an available slot in the large object container.

66. STANDARD (FIXED-FORMAT) DATA SET: In the Enterprise Database Server, a collection of related data records stored in a file in which all the records are of the same type and size.

67. STANDARD (VARIABLE-FORMAT) DATA SET: In the Enterprise Database Server, a collection of related data records stored in a file in which not all the records are of the same type and size.

68. STRUCTURECLONE: An RDB (Remote Database Backup) procedure that uses a DMUTILITY dump from a primary host following an OFFLINE structure format change, together with the secondary host audit trail to synchronize the structure at the remote host.

69. STRUCTURE NUMBER: A unique number-associates with a DMSII structure. A DMSII structure is a data set, set, subset, access or remap.

70. SUBSET: (1) An index structure that is identical to a set, except that the subset need not contain a record for every record of the data set. A set must index every record in its associated data set, whereas a subset can index zero, one, several, or all data set records. A subset might or might not be automatically maintained by the Enterprise Database Server; (2) A collection of indexes or pointers to the records of a single data set. A subset is used to access selected members of that data set and to represent relationships between the data set records. A LOCATOR SUBSET is a subset that is used to locate the large object in the large object container.

71. SUPPORT LIBRARY: A library that is associated with a function name. User programs can access a support library by way of its function name instead of its code file title. The operator uses the SL (Support Library) Operator Display Terminal (ODT) command to link function names with libraries.

72. UCF (USER COMMUNICATION FORM): A form used by Unisys customer to report problems and express comments about Unisys' products to support organizations.

73. UWA (USER WORK AREA): This contains record of a dataset. BDMS compilers allocate this array row when user programs are compiled.

74. UNISYS e-@ction ENTERPRISE DATABASE SERVER, EXTENDED EDITION FOR CLEARPATH MCP: An evolution of the standard Enterprise Database Server product in the areas of scalability, capacity, and availability. (See also UNISYS e-@ction ENTERPRISE DATABASE SERVER FOR CLEARPATH MCP). Glossary Item #75.

75. UNISYS e-@ction ENTERPRISE DATABASE SERVER FOR CLEARPATH MCP: A specialized system software package used to describe a database and maintain the relationships among the data elements in the database. (See also UNISYS e-@ction ENTERPRISE DATABASE SERVER, EXTENDED EDITION FOR CLEARPATH MCP). Glossary Item #74.

76. URL (UNIVERSAL RESOURCE LOCATOR): The URL is the address of a resource, or file, available on an Internet or Intranet. The URL contains the protocol of the resource: (e.g. http://or ftp://) The domain name for the resource, and the hierarchical name for the file (address). For example, a page on the Internet may be at the URL http://www.learnthat.com/define/u/url.shtml. The beginning part, http://provides the protocol, the next part www.learnthat.com is the domain, and the main domain is learnthat.com, while www is a pointer to a computer or a resource. The rest, /define/u/url.shtml is the pointer to the specific file on that server.

77. USER CHUNKSIZE: A numeric value specified by the user to indicate the size of data to be returned. In the FIND LOB command, the user has to specify the chunksize and an array, then data that will be returned via an array.

78. VDBS (VISIBLE DATABASE STACK): A set of commands that are issued directly to a database stack to interrogate or change some aspect of the database configuration. This is sample entry:

Use the "Gloss" paragraph style. Place the term or expression to be defined on the first line. Then enter 1 or 2 line breaks (<SHIFT><ENTER>)—not paragraph breaks. Next, enter the definition. The key is to keep one entry as one paragraph. If this is done, you can select all of the glossary entries and use the sorting function (under the Table menu) to alphabetize them.

DESCRIPTION OF PREFERRED EMBODIMENT

Figure 1:
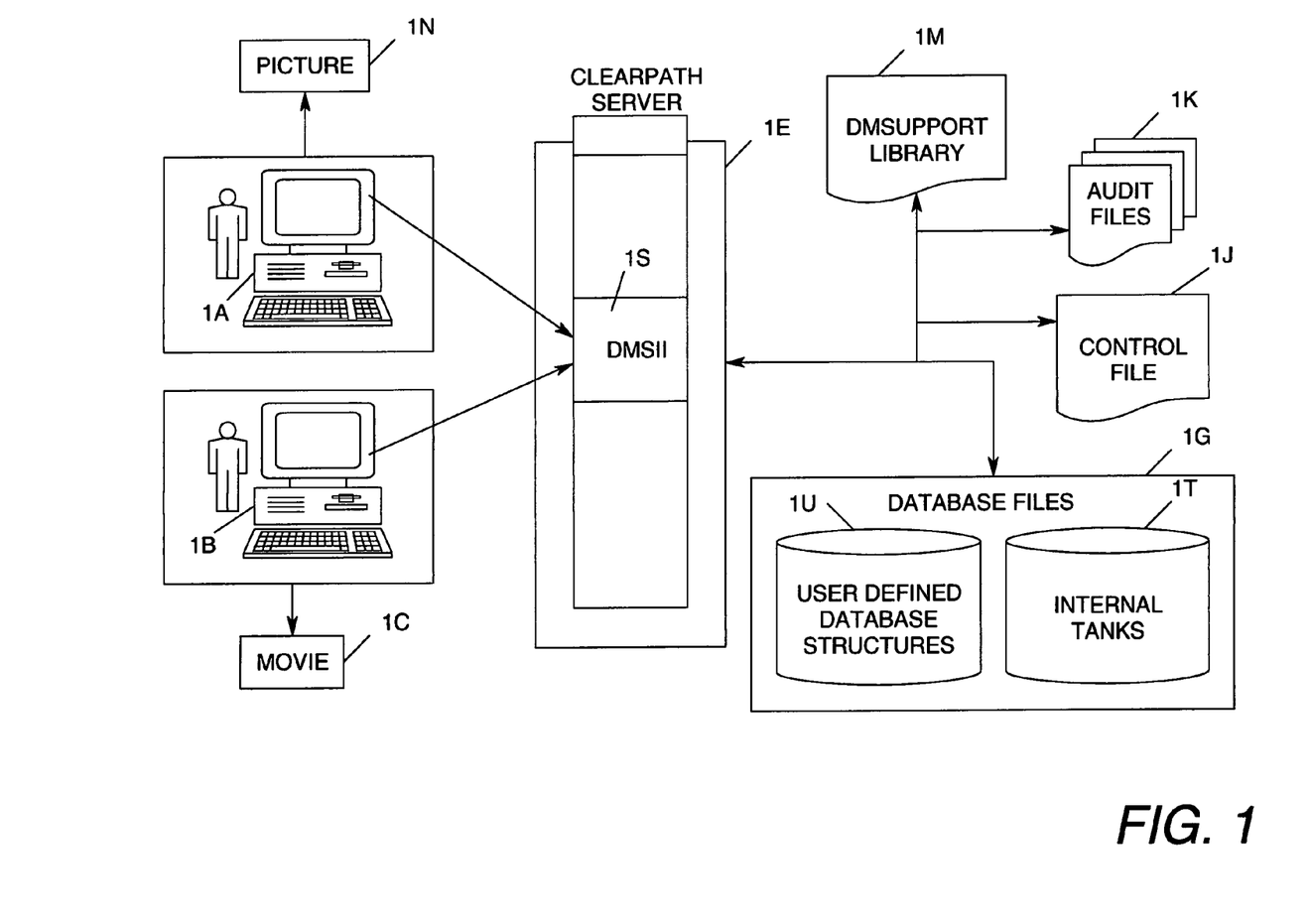
FIG. 1 is an overall block diagram of the elements involved in the present system for handling large objects.

Referring to FIG. 1 there is seen an overall block diagram of the present system and method for manipulating large objects on an Enterprise Server Data Management System.

As seen in FIG. 1 there is shown a client terminal 1A and another client terminal 1B. The client terminal 1A can be used to take a still picture such as item 1N so that this picture can then be downloaded into the data management system DMSII via a DB engine (Database Engine) 1S inside the Clearpath server 1E. The Database Engine 1S provides an ACCESS- ROUTINES set of programs for managing the server database 1G in accessing data and/or creating, modifying or deleting data.

Similarly, the PC client terminal 1B can be used to access a set of digital motion pictures (movie 1C) which can then be loaded into the data management system engine 1S inside the Clearpath server 1E.

Similarly, the PC client terminals 1A and 1B can also be used to retrieve such types of information from the database files 1G should this be desired. Thus, PC terminal 1A can retrieve still pictures and indicate them at 1N or else PC terminal 1B can retrieve moving pictures 1C for display on its terminal.

The Clearpath server 1E is one of a family of enterprise-class servers available from Unisys. The family includes the Clearpath server, the Clearpath A series server and the Clearpath 2200 series server.

The data management system (DMSII) designated 1S also designated as a database engine and provides a specialized system software package used to describe a database and maintain relationships among a database.

A DM support library 1M is connected to a set of audit files 1K and a control file 1J. These files and the support library are connected to the data management system 1S and also to the database files 1G.

The DM support library 1M is a library associated with a function name. This DM Support Library is a tailored library that contains "entry points" for application programs to obtain database information at runtime.

The audit files 1K are logically considered to be the sequential storage of Audit Records. This is actually the sequential storage of Audit Blocks that contained Audit Records. Traditionally, an Enterprise Data Server Audit File is implemented with a single Master Control Program (MCP) disk file.

With the Data Management System II, (DMSII) then multiple MCP disk files can be used to implement a single Audit File. Each of these disk files is referred to as a Section of the Audit File.

The Database Control File 1J is a file unique to each database and is used to maintain state information between each activation of the database, as well as across Halt/Loads. This file contains essential control information for the KEYE-DIOII system. For example, this would indicate the maximum number of buffers that can be used or the maximum elements of memory which can be allocated.

Figure 2:
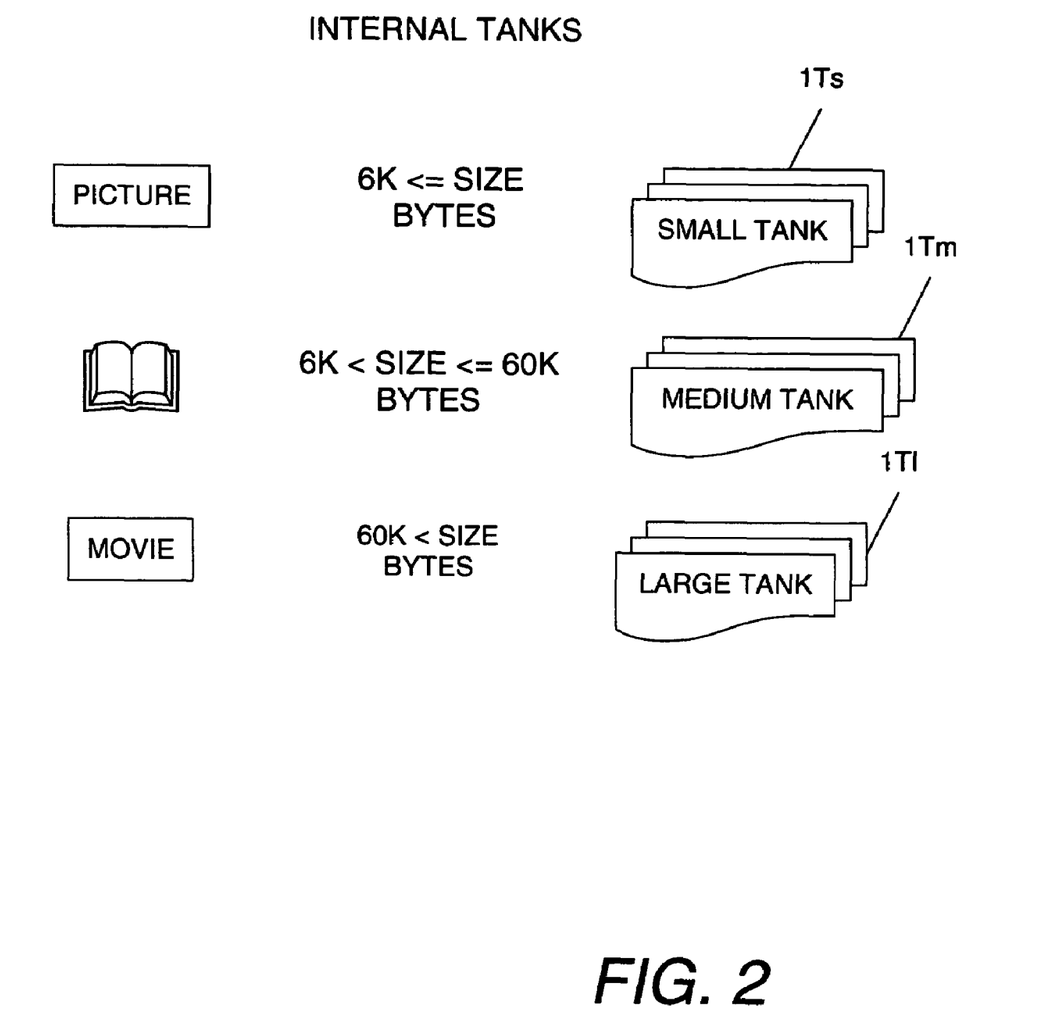
FIG. 2 is a schematic drawing showing the various size internal tanks utilized in the present system.

Further in FIG. 1 there is seen the Database Files 1G. As seen within the database files, there is a series of internal tanks, 1T. These tanks can be sectioned off (as seen in FIG. 2) according to their size and categorized as—small tank, medium tank, and large tank. The "Internal Tanks" are structures automatically generated when Users declare LOB (large object) items in the DASDL (Data and Structure Definition Language).

A tank is a physical data file or container of large object data.

Now, within the Database Files, 1G there are user-defined database structures, 1U.

User Defined Database Structures, 1U, consist of data sets, set, subsets, data items and global items that are defined by users in DASDL. In brief summary:

A dataset is a collection of related data records stored in one or more files on a random access storage device.

A set is a structure that allows access to all records of a dataset in some logical sequence.

A subset is similar to a set. Unlike a set, a subset need only refer to certain selected records in the data set.

Data item is a field in a database record used to contain an individual piece of information.

Global data are the data items that are not a part of the data set. Global data items generally consist of information such as control totals, hash totals, and populations, which apply to the entire database. All global data items are stored in a single record.

Now referring to FIG. 2, there is seen various sections of the internal tanks, 1T of FIG. 1. Here for example there is shown a series of small tanks 1Ts which are limited to a particular size, that is to say 6K bytes or less will constitute a small tank. This may be correlated, for example, to a single still picture shown in FIG. 2.

Another series of tanks shown are the medium-size tanks, 1Tm. These tanks are designated for having a capacity of greater than 6K bytes and less than 60K bytes (kilobytes). This, for example, might constitute the information found in a book or novel, as indicated in FIG. 2.

Further, in FIG. 2, there is seen a series of tanks designated as a large tank, 1Tl. The large tank is a tank which would have the size of greater than 60 kilobytes (60K) bytes, and this might be correlated to the digital information required in a particular digitized movie such as seen in FIG. 2.

Figure 3:
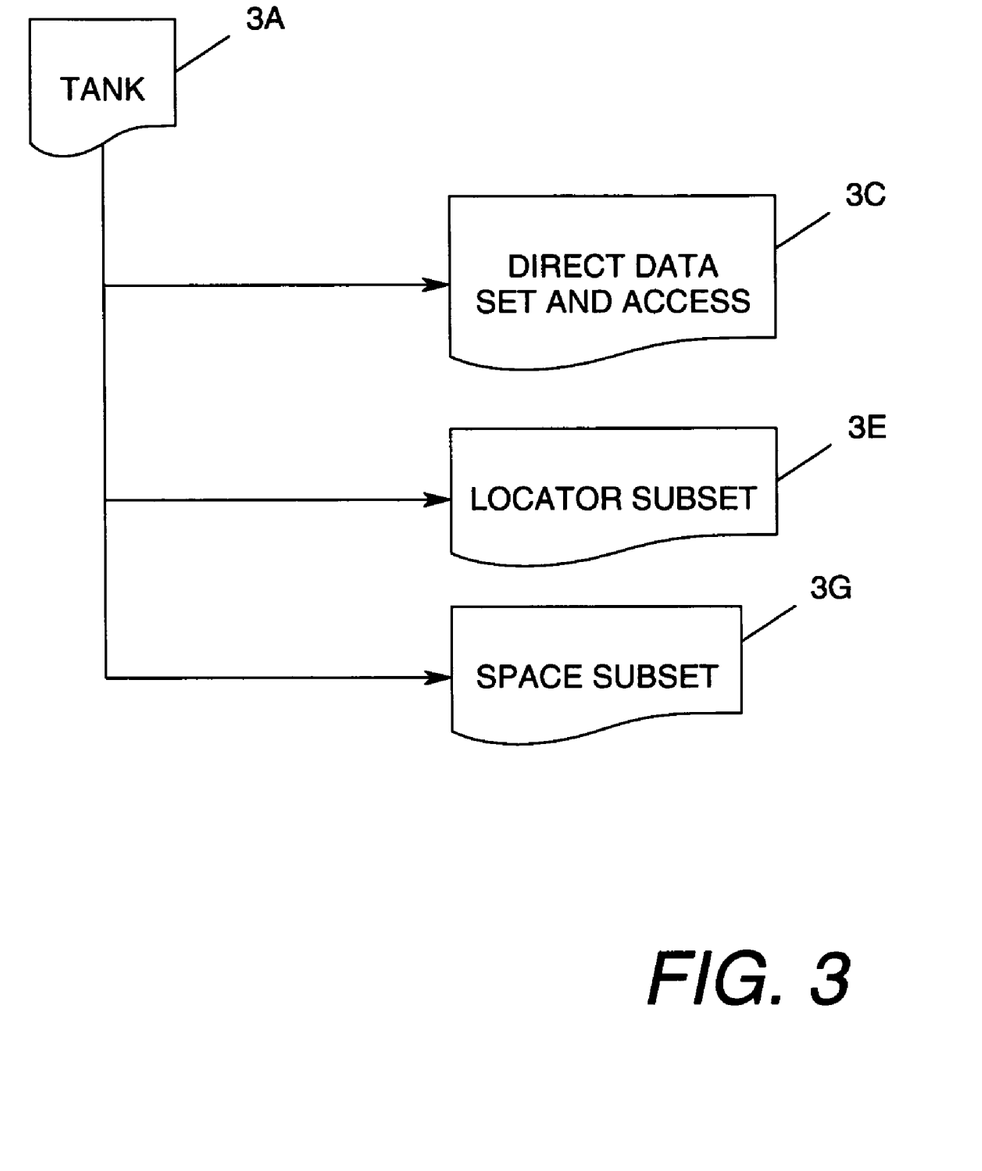
FIG. 3 is a block drawing showing how each of the tanks are connected to modules for direct data access, for the locator subset and for the space subset.

FIG. 3 is a drawing showing the operative components of the Internal Tank.

Each Tank 3A consists of three aspects which involve:
(i) the Direct Data Set and Access, 3C;
(ii) the Locator Subset, 3E;
(iii) the Space Subset, 3G.

The Direct Data Set, 3C, is a DMSII data set type. This is the file where the data of a large object would reside.

Then there are two spanning subsets (index) that span the Direct Data Set, 3C. One subset, Locator Subset 3E, is used for "finding" an existing "Large Object" in the tank file.

Figure 5:
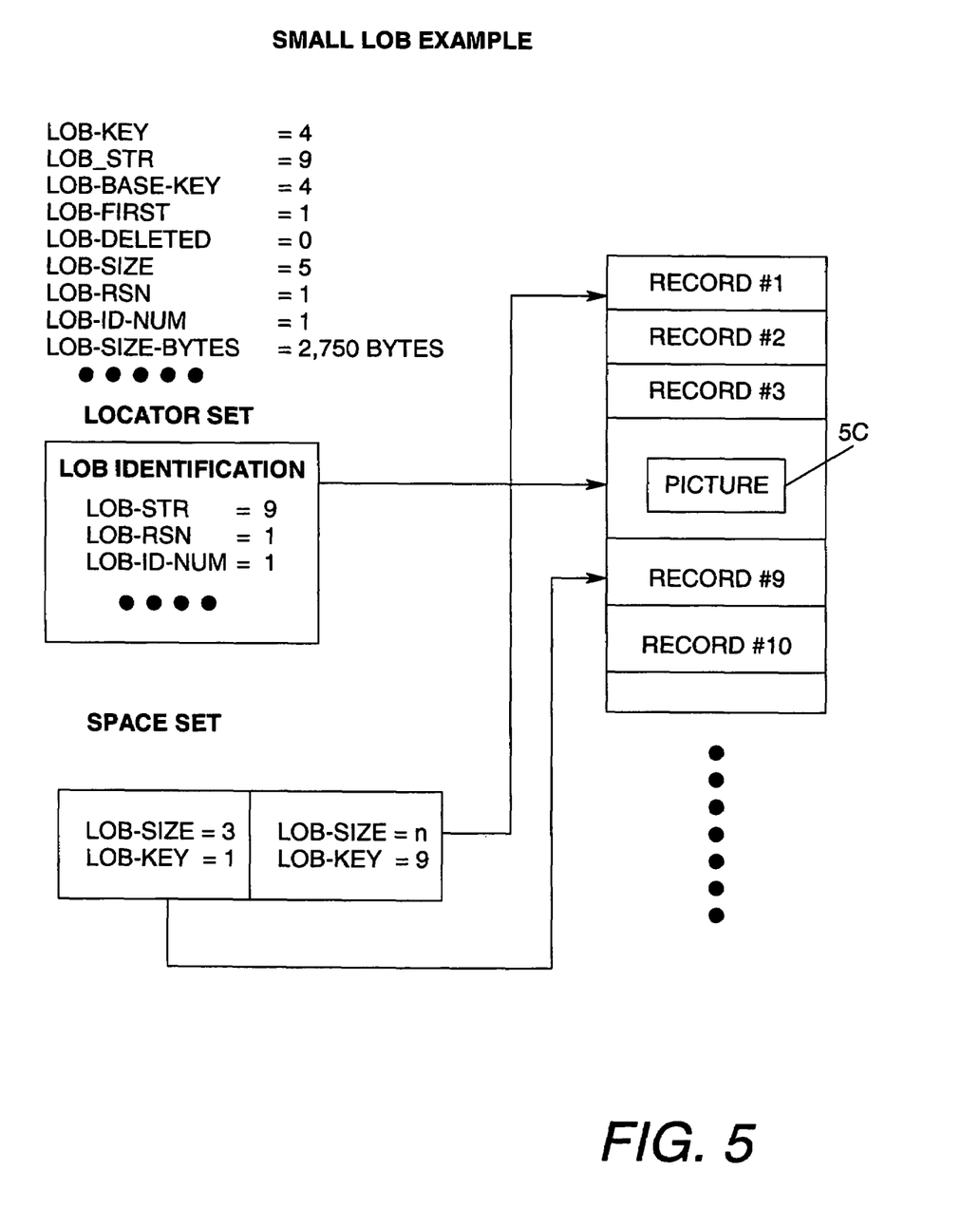
FIG. 5 is an illustration of the data structure involved for the present system showing various related items of the large object data structure as applied to a small LOB.

The Space Subset, 3G, is a subset (index) that spans the Direct Data Set, 3C, and is used for finding an available memory slot to store a "new" Large Object (LOB). FIG. 5 illustrates use of the Locator Set and the Space Set.

Figure 4:
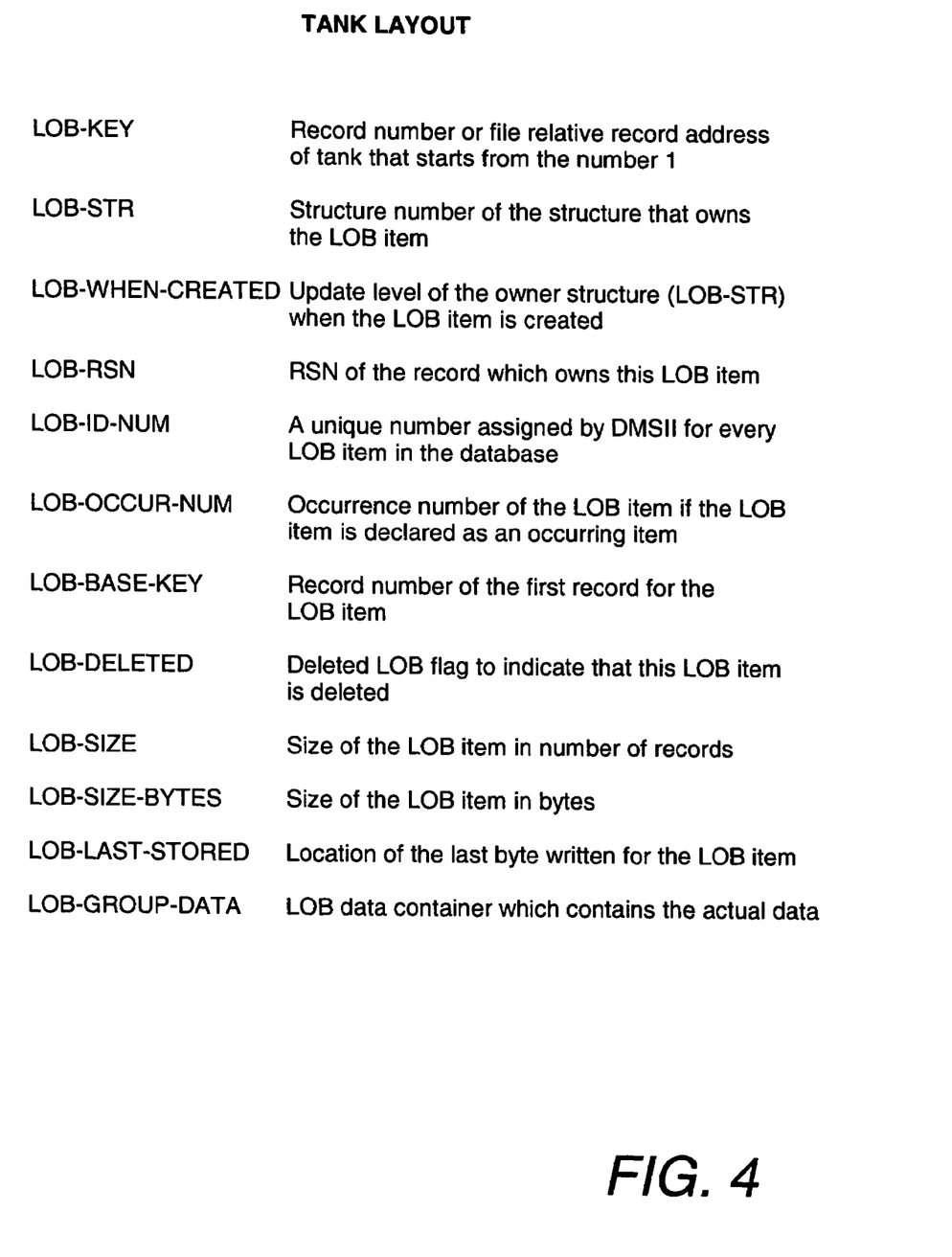
FIG. 4 is a schematic drawing showing a set of parameters for the TANK layout.

FIG. 4 is a chart illustrating relevant parameters used for the TANK layout.

Here the LOB-key shows the record number or the relative address of a given tank that starts from the number "1" record number.

Other parameters shown involve the structure number (LOB-STR), the update level (LOB-WHEN-CREATED) and Record Serial Number (LOB-RSN).

Further parameters which relate to each Tank include:
A unique number for every LOB item (LOB-ID-NUM).
An occurrence number (LOB-OCCUR-NUM).
The record number at the first record for the LOB item (LOB-BASE-KEY).
A deleted LOB Flag (LOB-DELETED) to indicate that this LOB is deleted.
The size of the LOB in number of records involved (LOB-SIZE).
The size of the LOB item in bytes (LOB-SIZE-BYTES).
The location of the last byte written for the LOB item (LOB-LAST-STORED).
The LOB data container of the actual data (LOB-GROUP-DATA).

FIG. 5 illustrates an example of a small LOB item to illustrates an example of a small LOB item (as data from a picture, 5C).

As seen in FIG. 5, there is a series of Records—Record #1 through Record #10.

The digital data of a photo or picture 5C is seen to occupy Records #4 through #8. The picture 5C has a data size of 2750 bytes and occupies five blocks numbered 4, 5, 6, 7, 8. Each block or record can store up to 600 bytes of data.

The statement LOB-KEY=4 and LOB-FIRST=1 will indicate that the "first" record for the picture is at Record number 4. The item LOB-SIZE=5 indicates that the picture utilizes 5 Records, or blocks (4,5,6,7,8).

Note that the picture data 5C has a Locator Set showing a "LOB IDENTIFICATION" (which is specified by the parameters that were listed in FIG. 4) and FIG. 5 shows the LOB-STR=9, the LOB-RSN=1 and LOB-ID-NUM=1. Then the SPACE SET applies to Record #1 through Record #9 and indicates LOB-SIZE=3; LOB-KEY=1, LOB-SIZE=n and LOB-KEY=9.

Further, the SPACE SET in FIG. 5 specifies the space allocated between Record #1 (LOB-KEY=1) and Record #9 (LOB-KEY=9).

The LOB-SIZE=3 signifies the size of an LOB item in terms of the number of records involved, i.e. 3. Here, records #1-3 are involved.

The LOB-SIZE=n signifies there are n records in this space set entry.

Figure 6:
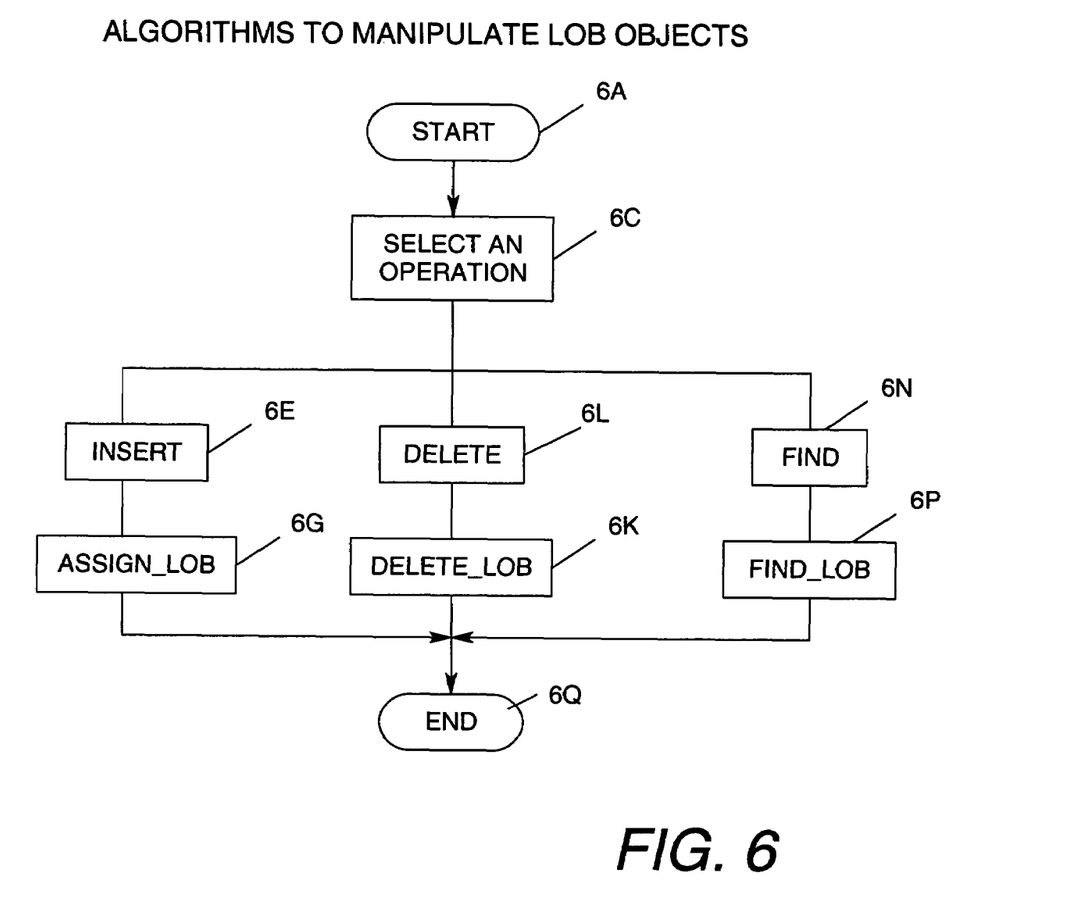
FIG. 6 is flow chart illustrating an algorithm to manipulate a large object, including the actions of insertion, deletion, and finding the object.

Referring to FIG. 6, there is indicated an algorithm which indicates a flowchart showing how the system provides for the manipulation of large objects.

The process starts at item 6A and proceeds to item 6C which involves the selection of one of three particular operations.

One selection that may be made at item 6E is involving insertion of a large object (LOB). Another possibility is at item 6L which may involve the deletion of a large object (LOB). Then at item 6N there is the option of FIND in order to find and locate and get access to a stored large object (LOB).

Starting at step 6E which involves the insertion of a large object, the next step involves step 6G which involves the assignment for storage of a large object. The details of assigning a large object for storage is later shown in FIG. 7.

Now returning to step 6L which involves the deletion of a large object. This step proceeds to step 6K which involves a series of processes involving deletion of a large object which is shown in detail in FIG. 8.

Now returning from step 6C to step item 6N, this involves the locating of a stored large object. This proceeds to step 6P which involves the retrieval of a particular large object (LOB) and the various processes involved are indicated in detail in FIG. 9.

When either one of the cycles of action of 6G, 6K, or 6P are completed, then the process ends as shown in the block 6Q of FIG. 6.

Figure 7:
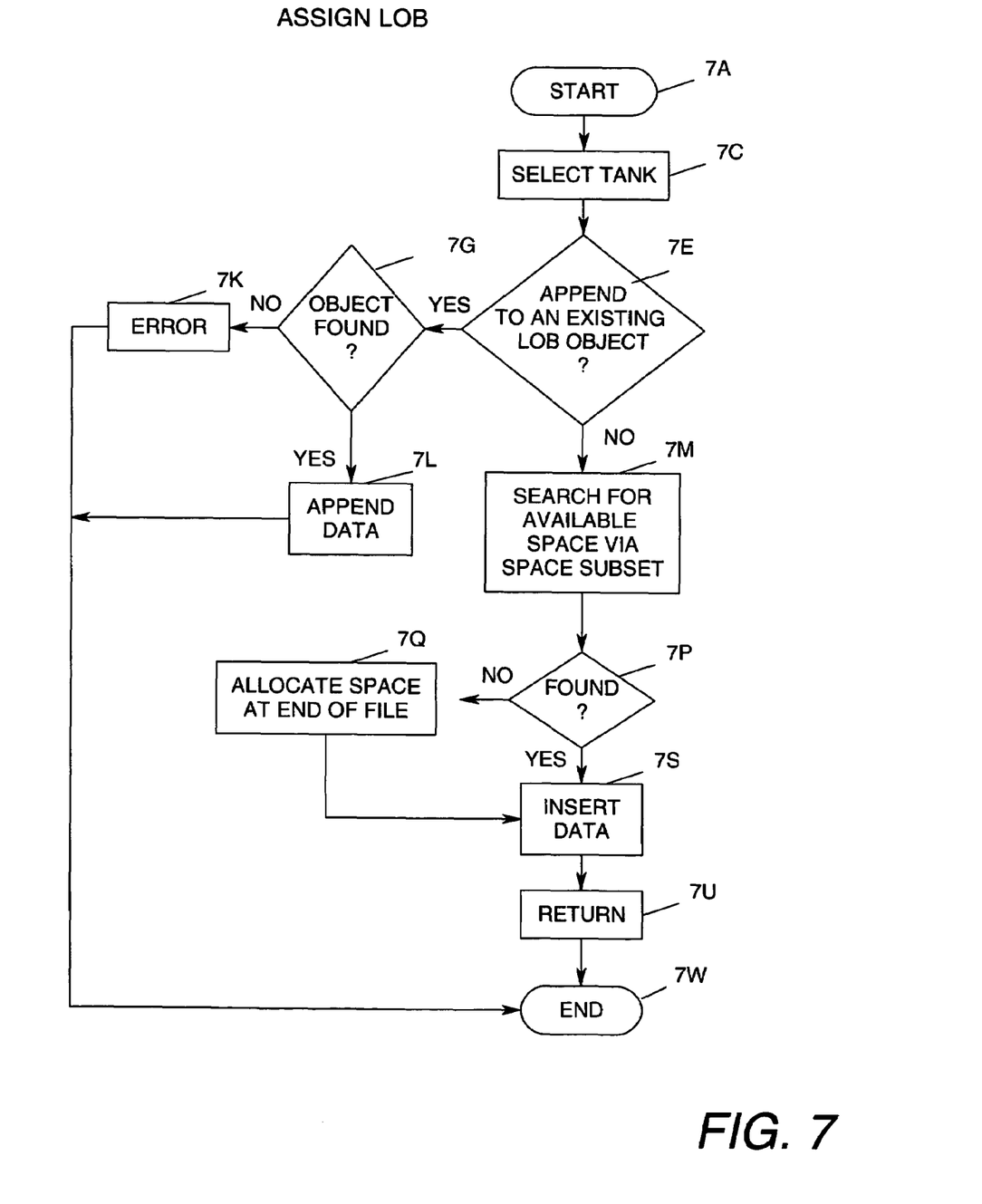
FIG. 7 is a flow chart indicating the steps involved in inserting and assigning a large object into the database.

Now referring to FIG. 7, there is seen a flowchart which involves the process steps of assigning a large object (LOB) for storage in a database.

The sequence starts at item 7A and proceeds to step item 7C which involves the selection of a particular tank. This selection will depend on the size of the object as to whether the object will be using a small tank, a medium tank or a large tank. The tank sizes are seen in FIG. 2.

Then at step 7E a query arises as to whether the large object to be stored can be appended to an existing large object. If the answer is (NO), at step 7E, then the sequence proceeds to step 7M in which case there is instituted a search for available space via the space subset (3G of FIG. 3).

The sequence then proceeds to step 7P which involves a query as to whether the available space has been found. If the space has been found (YES), then the sequence proceeds to step 7S whereupon the large object data is inserted into the appropriate space. Then at step 7U a return is made back to the PC client 1A or 1B (FIG. 1) to indicate completion of the insertion of the large object into the database after which at step 7W the sequence comes to an end.

Now returning to step 7M and then to step 7P to query if the available space was found. Here if the answer is NO, then the sequence proceeds to step 7Q whereupon appropriate space is allocated at the end of a file. This is the physical file for the large object container. After this the sequence proceeds to step 7S to insert the data involving the large object after which at step 7U, a return is made to the PC client (1A, 1B) to indicate completion.

Now returning to step 7E which involves a query as to whether to append the large object to an existing large object and whereupon the answer here is "YES". In this case the sequence moves over to step 7G in which there is another query as to whether the object (to which data is appended) has been found. A YES indicates that the existing LOB object has now been found and that the new LOB item will be appended to it at step 7L

Thus, if the answer to step 7G is "YES" (object found) then the sequence moves to step 7L where the newly inserted data will be appended to the old data after which the sequence proceeds to completion at step 7W. The client-user receives an acknowledgment after ASSIGN LOB is completed.

Again returning to step 7G, there is the query as to whether there was found the object to which the new object should be appended. Here if the answer is "NO" then the sequence proceeds to step 7K which develops an error signal which is returned to finish off the cycle at step 7W.

Figure 8:
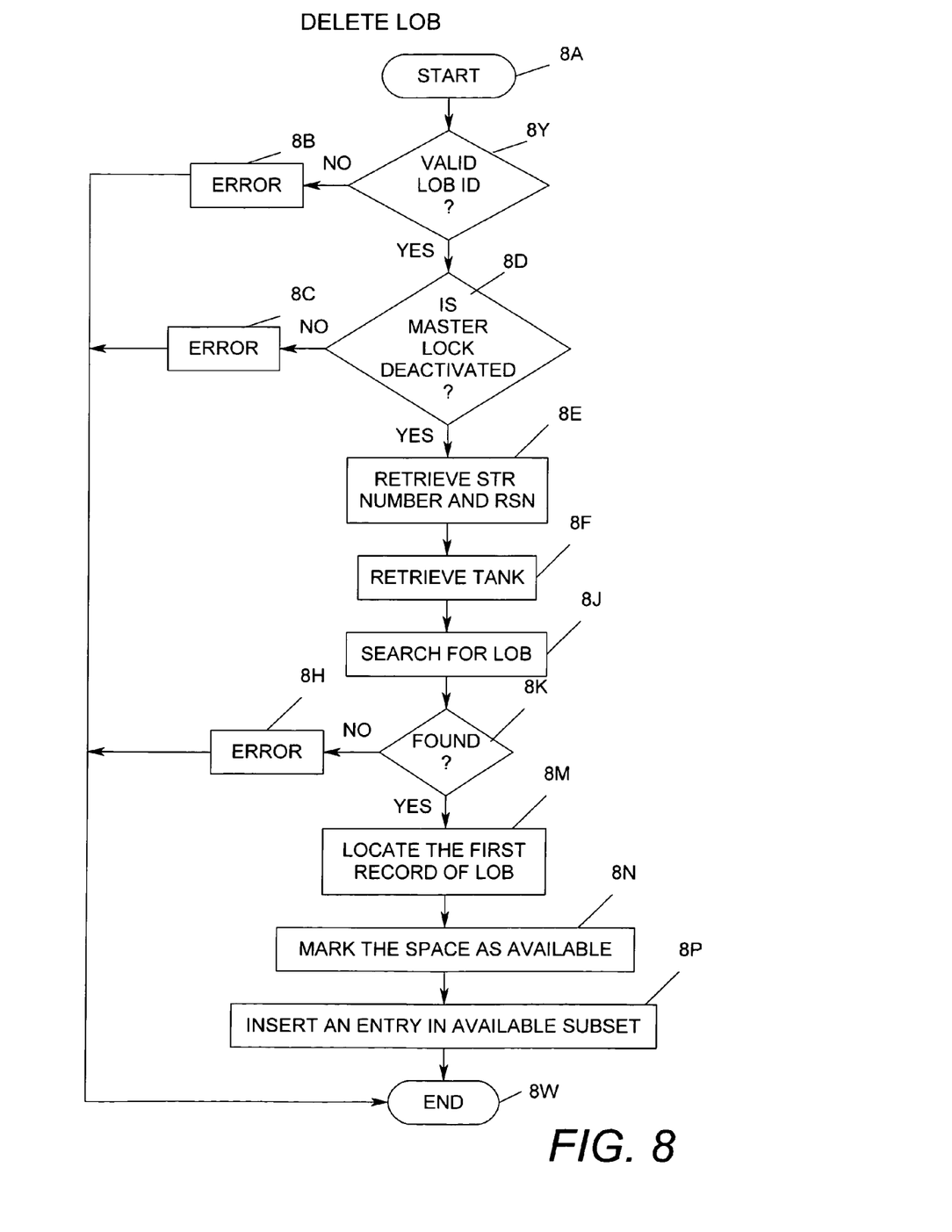
FIG. 8 is a flow chart indicating the steps involved for deleting a large object from the database.

Referring to FIG. 8, there is a sequence of steps by which is accomplished the deletion of a large object (LOB).

To delete a LOB in a record, the user locates and locks the record that owns the LOB item. User then requests a DELETE_LOB function. DMSII finds the LOB in the tank and performs the deletion.

Figure 9:
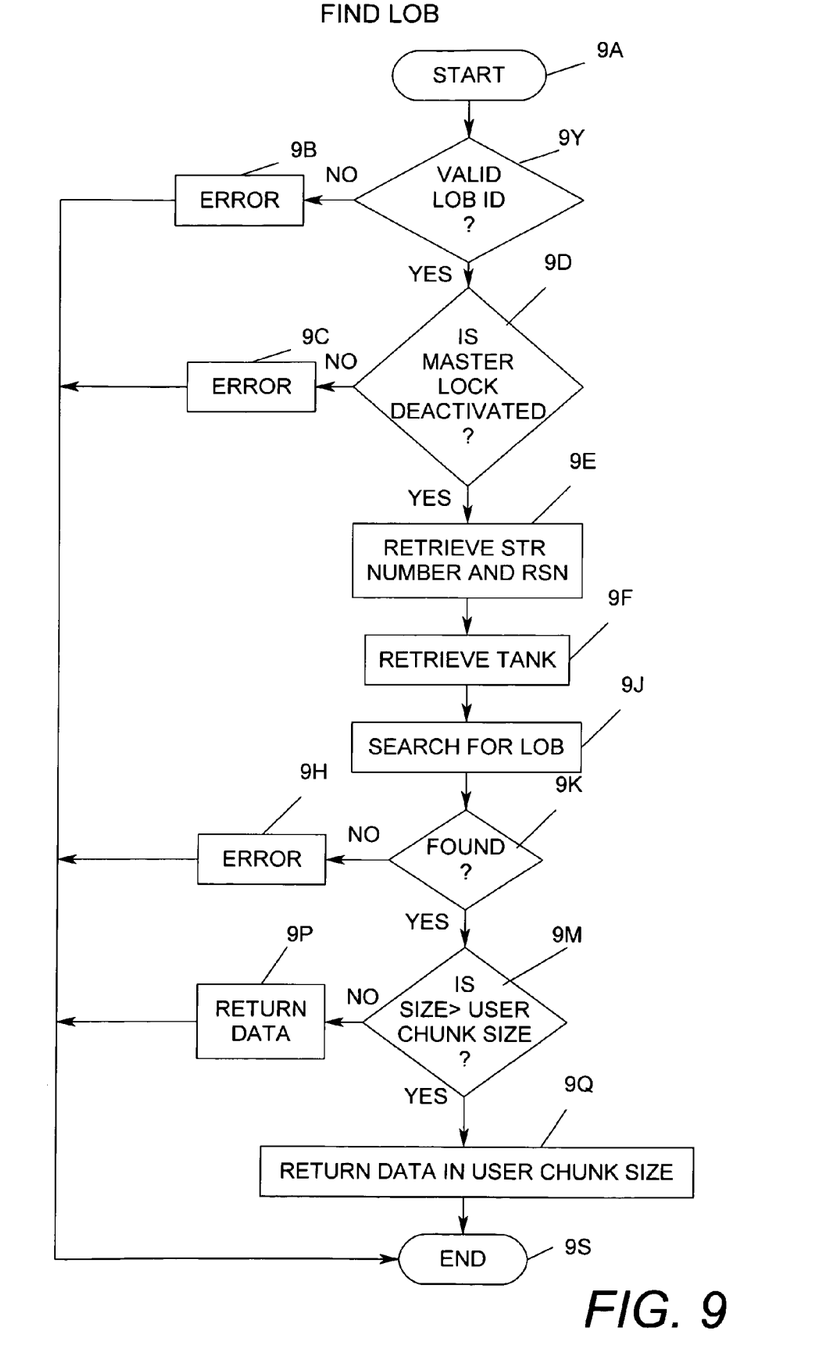
FIG. 9 is a flow chart illustrating the steps involved for a user to find a particular large object.

To find a LOB in a record, the user locates and locks the record that owns the LOB item. User can then request a FIND_LOB function. DMSII finds the LOB in the tank and returns the LOB item.

LOB items are in the DASDL source. TANK is a physical data file or container of Large Objects data.

The sequence starts at step BA and proceeds to step 8Y where a query is posed to decide whether the ID of the large object is valid. If the answer here is "YES", then the sequence proceeds to step SD which poses another query as to whether a master lock is involved, to see if the data has not been locked-up and is now accessible.

A record consists of many data items. An Internal Large Object is one of those items. The Large Object data is not stored in the same storage space with the rest of the data items. It is stored in Tank files. When accessing Large Object data in Tank files, the record that owns the internal LOB item must be locked, otherwise another program can alter the record content and cause data corruption.

The master lock is a mechanism for sealing off data so that it cannot be accessed or altered. If the answer to step 8D is "YES", that is there is a master lock, then the sequence proceeds to step 8E. At step 8E the sequence will retrieve the STR (structure) number and the record serial number (RSN) seen in FIG. 4. After this at step 8F, a retrieval will be made from the appropriate tank section.

After this at step 8J, a search is instituted for the large object. Then at step BK a query is presented at to whether the large object desired has been found. If the answer is "YES", then at step BM, the system will locate the first record of the large object. After this is done, then at step 8N, the system will mark the record space as available and at step 8P, the system will insert an entry in the space subset after which the sequence will end at step 8W.

Now returning to step 8Y, if there is not a valid ID for the large object which results in a "NO", then, at step BB, an error is generated after which the sequence is ended at step 8W.

Returning now to step 8D, if a master lock is involved which locks up the data, that is to say, "NO", then again at step 8C an error signal is developed and the sequence ends at step 8W.

Now returning to step 8K, in the search for the large object (LOB), if the large object is not found, "NO", then the sequence proceeds to step 8H where an error is generated and the sequence ends at step 8W.

Now referring to FIG. 9, there is seen the process steps involved in order to "find" a particular large object (LOB).

The sequence starts at step 9A and proceeds to step 9Y which presents a query as to whether the ID of the large object is a valid ID. Here if the answer is "YES", the sequence proceeds to step 9D which involves another query as to whether or not a master lock is involved.

If the answer at 9D is "YES" to indicate that the master lock is in operation, the process proceeds to step 9E which involves the retrieval of the structure STR number and the record serial number (RSN).

With the retrieval of the STR number and the record serial number, it is then possible to proceed to step 9F where the specific tank is to be retrieved. Then the sequence proceeds to step 9J where a search is made for the particular large object (LOB) involved, in the appropriate tank involved.

The next step which is step 9K involves a query as to whether or not the particular large object has been found. If the answer here is "YES", then the system proceeds to step 9M where there is another query presented. At step 9M where the query asks, is the size of the large object greater than the user-chunk size. Now if the answer here is "YES" then the sequence proceeds to step 9Q where the data is returned to the client user (1A, 1B) in chunks of user requested chunk size. After this the sequence ends at step 9X, a numeric value is specified by the user to indicate the size of data to be returned. In the FIND LOB command, the user has to specify the chunksize and an array, then that data will be returned via an array.

Now returning to step 9Y where a query was presented as to whether the ID of a large object was valid. Here if the answer is "NO", then at step 9B an error signal is generated and the sequence ends at step 9X.

Now also returning to step 9D where the query was presented as to whether a master lock was not operative. Here if the answer is "NO", then the sequence proceeds to step 9C to generate an error signal after which the sequence ends at step 9X.

Similarly, at step 9K, there is the query as to whether a particular large object has been found. If the object has not been found "NO", then at step 9H an error signal is generated and the sequence ends at step 9X.

Similarly, at step 9M where the query asks—is the size of the large object greater than the user chunk size. Here if the answer is "NO", then the sequence proceeds to step 9P where the data of the LOB is returned to the client user.

After step 9P, the sequence proceeds to step 9X which terminates that sequence.

In step 9M, if the size of the LOB is greater than user requested chunk size, then the data is returned in chunks of user requested chunk size. LOB data is returned to the client user.

Presented herein has been an enterprise data management system which has the extended capability of handling large objects such as digitized still pictures, digitized books of considerable size and digital movies that have unusually large numbers of digital informational bytes. A series of internal tanks are provided which provide a small tank for holding less than 6 kilobytes, then a medium tank which holds between 6 kilobytes to 60 kilobytes followed by a large tank which handles sizes greater than 60 kilobytes.

Thus, there are now situated a set of database files with internal tanks which can hold the information involving various types of large objects.

The present system then uses a database engine which is connected to several client PCs and to several auxiliary files which enables a number of manipulations to be handled in the use of large objects. As a result, the system and method provides the ability to manipulate large objects so that large objects can either be inserted into the database or they can be deleted from the database. Additionally the system permits a search to occur so that a particular large object can be found and retrieved.

While one embodiment of the present invention has been illustrated, it should be understood that other versions are possible and will fall within the compass of the attached claims.

What is claimed is:

1. In a database management system employing a server means operating under a specialized Master Control Program and oriented to manage storage and retrieval and manipulation of large objects in digitized format, a system for handling large objects comprising:
   (a) a database management server means (DMSII) connected to multiple client-PC stations for the reception of digital data and for the transmission of digital data which encompasses selected sizes of said digital data wherein said database management server means supports said multiple client-PC stations to manipulate large digital objects so to enable a client-PC to (i) insert a large object into database storage (ii) delete a large object from storage or (iii) find a selected large object in storage for subsequent retrieval;
   (b) database file means for storing said digital data according to the size of each package of digital data wherein said database file means is organized into memory tanks customized to hold digital large object data according to the size of each large object, and wherein said memory tanks are organized into categories designed where (i) said small tank is sized to hold objects of 6K (kilobytes) or less, (ii) said medium tank is sized to hold objects of size between 6K to 60K (kilobytes) and (iii) said large tank is sized to hold objects of size greater than 60K (kilobytes), and wherein said database file means consists of a sequence of records and each record has a Record Serial Number (RSN) assigned by said server means;
   (c) auxiliary support means including a Control File, Audit Files and a Data Management Support Library for controlled communication between said server means and said database file means.

2. The system of claim 1 wherein each large object, in said database file means, is provided with a structure giving the ID of the large object, its record number, its size in records, its size in bytes, its date of creation, the Record Serial Number (RSN) of the record which owns the large object, plus associated parameters.

3. The system of claim 1 wherein said Control File operates in said auxiliary support means to maintain state information for each activation of said database file means and to provide control information as to the maximum elements of memory that can be allocated.

4. The system of claim 3 wherein said Audit Files constitute the sequential storage of Audit Blocks that contain the audit records.

5. The system of claim 3 wherein said Data Management Support Library is utilized to enable user programs to access information for the user program.

6. The system of claim 1 wherein said large object digital data may constitute (a) Binary Large Objects (BLOB) or (b) Character Large Objects (CLOB).

7. In a database management system utilizing a server means under control of a specialized Master Control Program and oriented to storage of large objects (LOB), where each stored Large Object (LOB) has a selected ID to identify it and utilizing a numbered structure (STR) which holds each stored LOB, plus a record serial number (RSN) which sets a number value to each dataset of related records in a file, wherein a database engine in a server means operates with a database file means to enable a client-PC to manipulate large objects, based on a selected chunk size, a method for handling of large objects in said database file means comprising the steps of:
- (a) inserting a large digital object (LOB) into a selected tank memory according to the size of said large digital object said inserting operating to utilize a key index designated SPACE SET for finding an available memory slot; wherein step (a) of inserting a large digital object (LOB) includes the steps of:
  - (a1) assigning said selected LOB for storage in said database files;
  - (a2) selecting a memory storage tank according to the kilobyte (KB) size of said selected LOB;
  - (a3) querying if said selected LOB can be appended to an already existing LOB object;
  - (a4) if step (a3) indicates a YES, then querying if said already existing LOB has been found;
  - (a5) if step (a4) indicates a YES, said already existing LOB is found, then appending said selected LOB on to said already existing LOB;
- (b) deleting a stored digital large object according to the selected ID of said large digital object;
- (c) finding, locating and retrieving a selected digital large object in said database file means after verifying that said digital large object has a valid ID.

8. The method of claim 7 wherein said querying (a3) if said selected LOB can be appended, indicates that NO, it cannot be appended, then said method further includes the steps of:
- (a3N1) searching for available memory space in said database files;
- (a3N2) querying to see if suitable memory space has been found;
- (a3N3) if step (a3N2) indicates YES, that suitable memory space has been found, then inserting said selected LOB into said memory space;
- (A3N4) returning an acknowledgement signal to said client-PC.

9. The method of claim 8 wherein said querying (A3N2) to see if memory space has been found indicates a NO, then the method includes the steps of:
- (a3N2N1) allocating file space at the end of the existing file which has the appropriate size for holding said selected LOB;
- (a3N2N2) inserting said data of said selected LOB into the appropriately sized database file.

10. The method of claim 7, which includes a Space Set index for finding an available memory slot wherein said deleting (b) of a stored digital large object (LOB) includes the steps of:
- (b1) checking to see if said selected-for-deletion LOB has a valid ID;
- (b2) if YES shows the ID is valid, then querying to see if a numbered structure (STR) holding said selected LOB is locked;
- (b3) if step (b2) is YES then retrieving the structure number (STR) and the record serial number (RSN);
- (b4) accessing the appropriate size memory tank holding said selected-for-deletion LOB;
- (b5) searching for said selected-for-deletion LOB;
- (b6) querying to see if said selected-for-deletion LOB is found;
- (b7) if step (b6) is a YES, then locating the first record of said LOB;
- (b8) marking the memory space selected as available;
- (b9) deleting the storage of the selected LOB's record number and its size in records for placement into the Space Set for later use.

11. The method of claim 7 wherein a selected user requested chunk size of LOB data is indicated by said client-PC and step (c) of finding, locating and retrieving a selected LOB includes the steps of:
- (c1) checking to see if said selected LOB has a valid ID;
- (c2) if step (c1) is a YES, then querying to see if a numbered structure holding said selected LOB is locked;
- (c3) if step (c2) is a YES, then retrieving the structure number (STR) and the record serial number (RSN) of said selected LOB;
- (c4) accessing the appropriate-size memory tank holding said selected LOB;
- (c5) searching for said selected LOB;
- (c6) querying to see if said selected LOB has been found;
- (c7) if step (c6) is a YES, then asserting a query to see if said LOB size is greater than said user requested chunk size;
- (c8) if step (c7) is a YES, then returning said LOB data to said Client-PC in chunks of said user requested chunk size.

12. The method of claim 11 wherein step (c7) indicates a NO saying the LOB size is not greater than said user requested chunk size then:
- (c7a) returning the accessed LOB data to said Client-PC.

* * * * *